Aug. 6, 1929. F. C. ALLEN Re. 17,392

MILLING MACHINE

Original Filed Jan. 14, 1922 2 Sheets-Sheet 1

Inventor
F. C. Allen

By Fawick & Witter
Attorney

Aug. 6, 1929. F. C. ALLEN Re. 17,392

MILLING MACHINE

Original Filed Jan. 14, 1922 2 Sheets-Sheet 2

Inventor
F. C. Allen
By Laurence L. Witter
Attorney

Reissued Aug. 6, 1929. Re. 17,392

UNITED STATES PATENT OFFICE.

FREDERICK C. ALLEN, OF HARTFORD, CONNECTICUT, ASSIGNOR, BY MESNE ASSIGNMENTS, TO KEARNEY & TRECKER CORPORATION, OF WEST ALLIS, WISCONSIN, A CORPORATION OF WISCONSIN.

MILLING MACHINE.

Original No. 1,543,242, dated June 23, 1925, Serial No. 529,333, filed January 14, 1922. Application for reissue filed June 17, 1927. Serial No. 199,615.

This invention relates to milling machines and particularly to an improved spindle supporting overarm construction therefor. Milling machines of the column and knee type, wherein a cutter is supported for operation on work mounted on a knee at the side of the column, require an overarm thereon for rigidly supporting the cutter on the column. In vertical spindle milling machines, the overarm is adapted to mount and entirely support the spindle above the knee, while in horizontal spindle milling machines the spindle is mounted horizontally in the column and the overarm is provided with an out-bearing hanger at its outer end for supporting the outer free end of a horizontal cutter arbor mounted in the spindle. The primary object of the present invention is to provide an improved overarm construction of the type stated which is adaptable either to a vertical spindle milling machine, a horizontal spindle milling machine or to a milling machine combining both horizontal and vertical spindles.

It is an object of the invention to provide in combination with a milling machine column, an overarm construction comprising a main overarm adapted to be mounted on the column and a plurality of bracing elements therefor extending from the column to the outer end of the overarm, the construction being such as to support the cutter spindle more rigidly than has been done heretofore.

It is another object of the invention to provide a milling machine comprising a column with a horizontal spindle therein in combination with two overarms, one such overarm being adapted only to support the outer end of a horizontal cutter arbor and the other overarm being furthermore provided with a vertical spindle therein and means for driving the same from the said horizontal spindle, means for securing either overarm to the column and a plurality of bracing elements extending from the column to the outer end of the overarm.

With the above and other objects in view, my invention consists in the features of construction and operation set forth in the following specification and illustrated in the accompanying drawings. In such drawings annexed hereto and forming a part of this specification, I have shown certain embodiments of my invention in a milling machine but it will be understood that the invention can be otherwise embodied and that the drawings are not to be construed as defining or limiting the scope of the invention, the claims appended to this specification being relied upon for that purpose.

Referring to the figures of the drawings.

Figure 1:
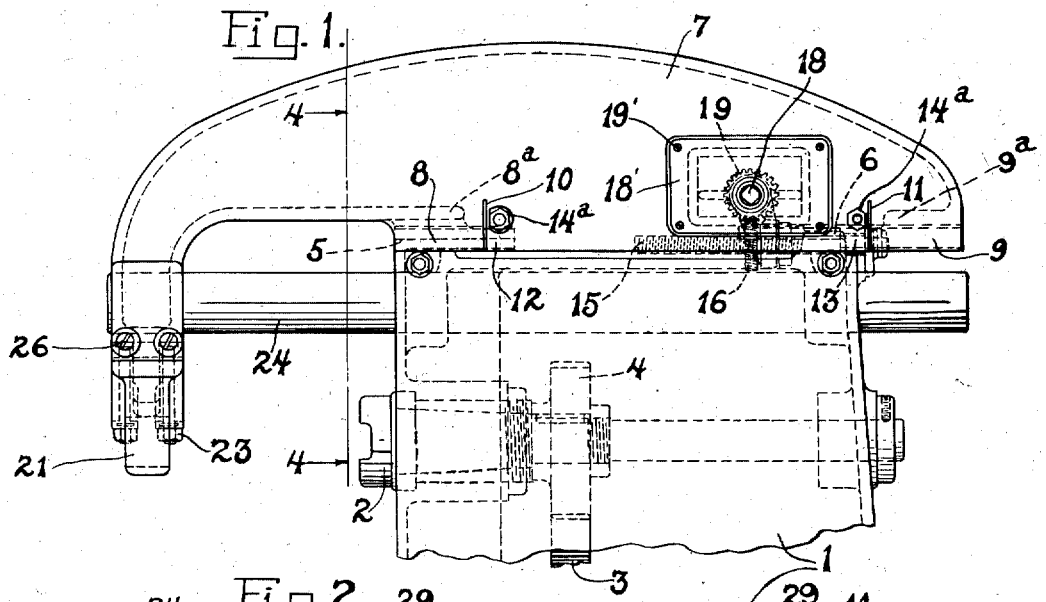
Figure 1 is a side elevation of the upper portion of a milling machine column provided with one form of my improved spindle supporting overarm construction.
Figure 2:
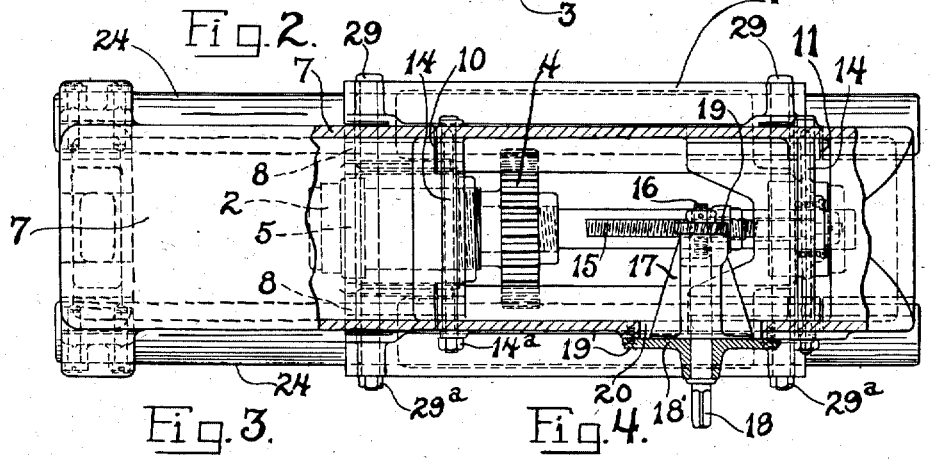
Fig. 2 is a plan view thereof.
Figure 3:
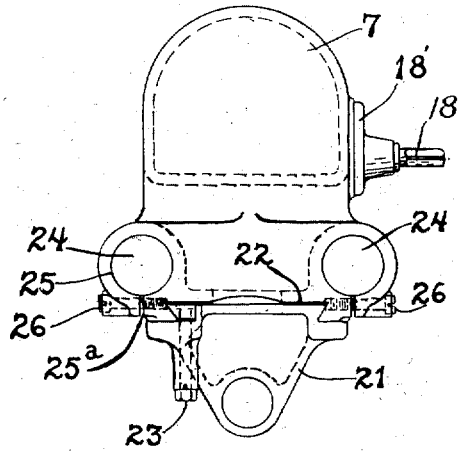
Fig. 3 is a front end elevation of the overarm and the out-bearing hanger thereon.
Figure 4:
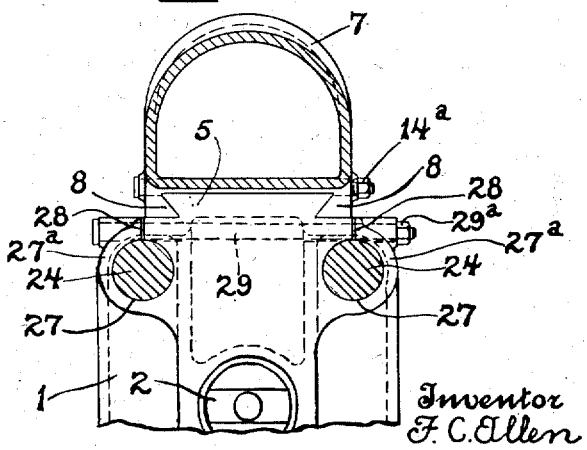
Fig. 4 is a vertical sectional view on line 4—4 of Fig. 1.
Figure 5:
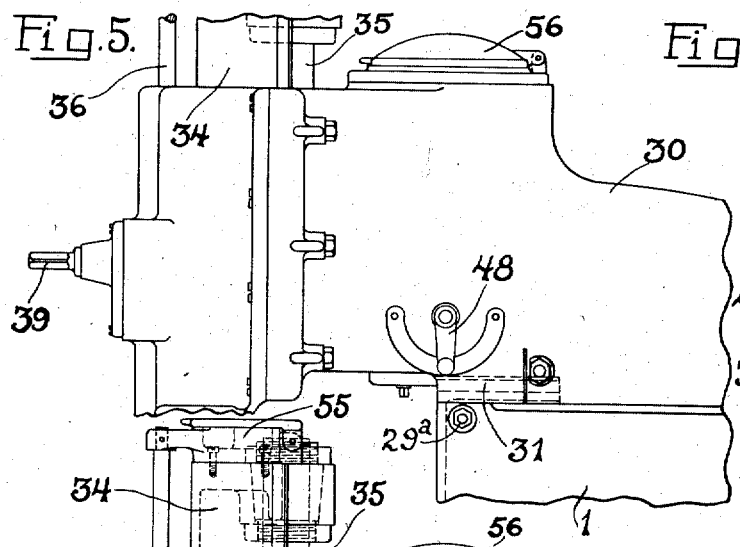
Fig. 5 is a side elevation of the column shown in Fig. 1 provided with my improved combined vertical and horizontal spindle supporting overarm.
Figure 8:
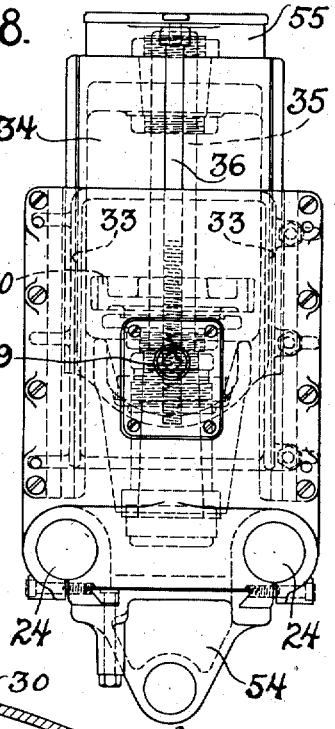
Fig. 8 is a front end elevation thereof.
Figure 6:
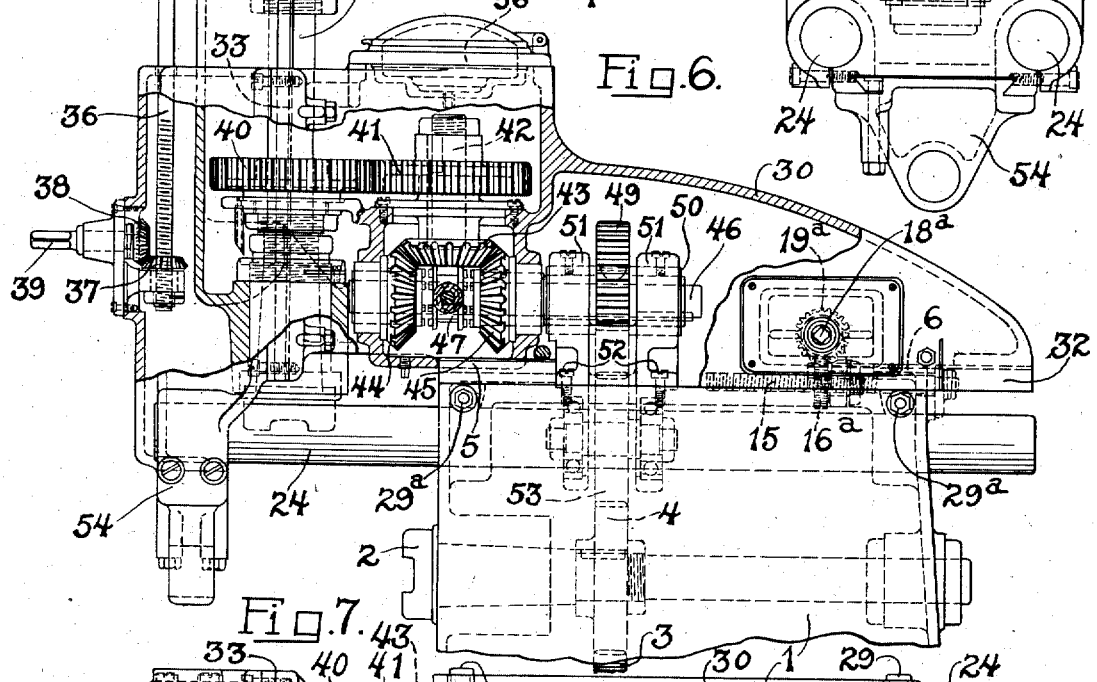
Fig. 6 is a sectional view of Fig. 5.
Figure 7:
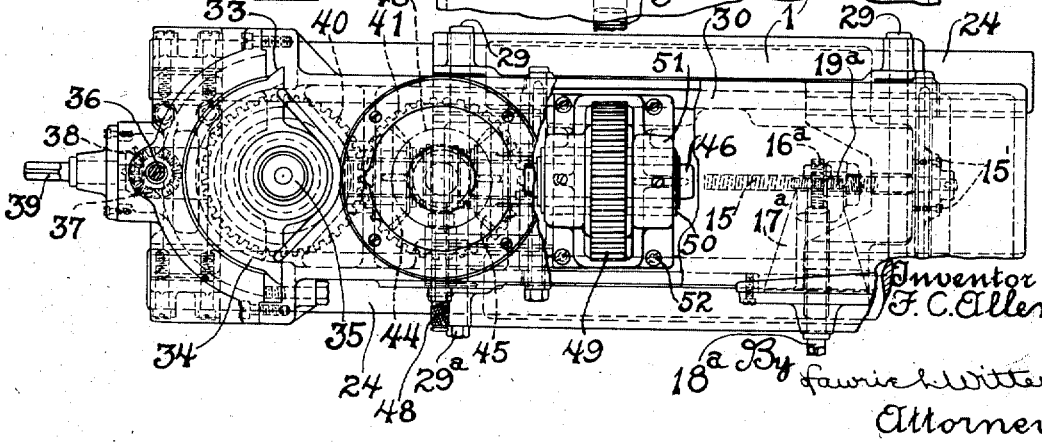
Fig. 7 is a plan view of Fig. 5.

In horizontal spindle milling machines of the column and knee type, the cutter arbor is supported between the spindle in the column and an out-bearing hanger at the end of an overarm on the column. My invention comprises an improved overarm construction for this purpose wherein, in addition to the usual overarm, there is provided two spaced bracing bars extending outwardly from the column at opposite sides of the spindle and having their outer ends secured to the downwardly extending outer end of the overarm, the arrangement being such as to form a rigid truss-shaped spindle supporting overarm and construction over the work support. This same arrangement may in like manner be applied to a vertical spindle milling machine or to a combined vertical and horizontal spindle milling machine, as illustrated in Figs. 5 to 8. As will be noted, the bracing bars referred to are secured to the column in a spaced position at opposite sides of the spindle in a manner to provide sufficient room therebetween for the operation of the vertical spindle, as illustrated in Fig. 8. It will be understood that the column and bracing bars shown in all figures of the drawings are the same, such construction being adapted to receive and support thereon either type of overarm.

Referring more specifically to the drawings by reference characters, 1 indicates the column of a milling machine provided with a horizontal spindle 2 therein. The spindle is driven from a gear 3 meshing with a gear 4 on the spindle. The top of the column is provided with spaced front and rear guideways 5 and 6, the column being hollow and open through the top thereof between such guideways as illustrated particularly in Figs. 1, 2, 6 and 7. The column is adapted to have mounted thereon either a horizontal spindle supporting overarm of the type illustrated in Figs. 1 to 4 of a vertical or vertical and horizontal spindle overarm of the type illustrated in Figs. 5 to 8.

As illustrated in Figs. 1 to 4, a hollow arm 7 is provided with spaced front and rear guideways 8 and 9 adapted to cooperate with the front and rear guideways 5 and 6 on the column. The overarm is provided with bottom walls 8ª and 9ª respectively connecting the outer portions of the front and rear guideways. Such guideways are slotted transversely at 10 and 11 whereby to provide front and rear flexible guideway portions 12 and 13. Through bolts 14 are provided for drawing the flexible portions 12 and 13 into tight clamping engagement with the column guideways 5 and 6.

As illustrated in the drawings, the arm is adjusted to its rearmost position on the column. The same may be adjusted forwardly the distance of the rear overhanging portion thereof shown in Fig. 1. A means for so adjusting the arm is illustrated as comprising a screw 15 rigidly secured to the column and extending longitudinally of the overarm. A spiral gear 16, mounted on a bracket 17, threadedly engages the screw. A shaft 18 also mounted in the said bracket transversely of the screw is provided with a spiral gear 19 thereon in mesh with gear 16. The bracket 17 and its several elements may be assembled in the overarm through a large opening 20 therein, the bracket being provided integrally with a plate 18′ adapted to be secured to the overarm by screws 19′ to support the bracket and form a cover for the said opening. Rotation of the shaft 19 is adapted to rotate the gear 16 on the screw and move the overarm longitudinally on the column. As will be noted, the overarm may be clamped in any of its adjusted positions by tightening the nuts 14ª on bolts 14.

The forward end of overarm 7 is curved downwardly and is provided with a spindle supporting out-bearing hanger 21 mounted in a horizontal guideway 22 therein. The outbearing hanger may be secured in position by means of clamping bolts 23. Combined with the overarm 7 for the purpose of providing an exceedingly rigid overarm construction is a pair of bracing bars 24, such construction constituting the principal novelty of the invention. The downwardly extending portion of the overarm is provided on each side thereof with an opening 25 for receiving one end of each of the said bars, the other ends of the bars being mounted in the column. The overarm portion forming each opening 25 is split at 25ª and provided with clamping screws 26 for drawing the said portions into tight clamping engagement with the bars. Through openings 27 are preferably provided in the column for receiving the bars 24. The column is slotted at 28 to provide resilient clamping portions 27ª. These portions may be drawn into tight engagement with the bars by means of through bolts 29 provided with nuts 29ª on the same side of the column as the clamping nuts 14ª. It will therefore be seen that the main overarm 7 and bars 24 may be rigidly secured together into a single overarm construction and longitudinally adjusted bodily in the column or the bars 24 may be rigidly secured to the column and the overarm 7 adjusted longitudinally on the column and along the bars.

The overarm 7 is assembled on the column in the following manner. The arm is suspended over the column with the rear ends of guideways 8 and 9 on the overarm directly in front of and in alignment with the front ends of guideways 5 and 6 on the column. The arm may then be moved rearwardly to engage the arm and column guideways, the nut 16 being threaded on to the screw 15 by rotating the shaft 19.

In Figs. 5 to 8, the column 1 and spindle 2 are the same as those shown in Figs. 1 to 4. The overarm 30 mounted on the column comprises a construction combining both a vertical spindle and a horizontal spindle overarm support. This overarm is provided with spaced front and rear guideways 31 and 32, the same as guideways 8 and 9 on the overarm 7, and such guideways engage the column guideways 5 and 6 and may be secured thereto in the same manner. The overarm is also provided at its rear end with a like adjusting shaft 18ª carrying a gear 19ª in mesh with a gear 16ª mounted on a bracket 17ª cooperating with the screw 15 on the column. This construction is the same as that already described in reference to Figs. 1 to 4 and is operated in the same manner.

The front end of overarm 30 is provided with a vertical guideway 33 in which is adjustably mounted a head 34 supporting a vertical spindle 35. A screw threaded rod 36 secured to the head is threadedly engaged by a gear 37 journaled in the overarm. The gear 37 may be rotated to adjust the head vertically by means of a cooperating gear 38 provided with an operating shaft 39. The driving means for the spindle 35 comprises the following mechanism. A gear 40 to which the spindle is splined for vertical movement is in mesh with a gear 41 on a vertical shaft 42. A bevel gear 43 on the shaft 42 is in mesh with two bevel gears 44 and 45 loose on a horizontal shaft 46. A clutch 47 splined to shaft 46 between gears 44 and 45 may be thrown in either direction by means of a handle 48 to operatively engage the shaft with either of such gears. The mechanism just described is mounted on the overarm. The driving mechanism for the shaft 46 now to be described is mounted on the column. This mechanism comprises a spur gear 49 keyed to a sleeve 50 rotatable within bearings 51. These bearings are mounted on the column and are secured thereto by means of screws 52. A gear 53 also supported on the column in the same manner is in mesh with gear 49. In the driving position illustrated the gear 53 is in mesh with the aforementioned gear 4 on the spindle and the shaft 46 is splined for sliding movement within the sleeve 50. It is obvious that the vertical spindle 35 may be driven in either direction from the horizontal spindle through the mechanism just described.

In addition to the vertical spindle illustrated it should furthermore be noted that the overarm 30 is also provided with an outbearing hanger 54 for supporting the outer end of a cutter arbor mounted in the horizontal spindle 2. The bracing bars 24 shown in Figs. 5 to 8 are secured to the column and in the overarm in the same manner as has been described in reference to the construction shown in Figs. 1 to 4. It will be noted that such bars are sufficiently spaced from opposite sides of the spindles to permit free operation of the vertical spindle 35 therebetween. The vertical spindle is adapted to be lubricated from an oil pot 55 formed in the top of the head 34 and the spindle operating gearing is adapted to be lubricated from an oil pot 56 formed in the top of the overarm 30.

The overarm 30 is assembled on the column in the following manner. The screw 15 is first removed from the column. The gears 49 and 53 are then mounted on and secured to the column in the position illustrated in Fig. 6. The overarm, with its bracket 17ª and mechanism supported thereon removed, is suspended over the column with the rear ends of guideways 31 and 32 on the arm directly in front of and in alignment with the front ends of guideways 5 and 6 on the column, as has been described in reference to the structure shown in Fig. 1. The arm is then moved rearwardly, the splined shaft 46 sliding within its driving sleeve 50 and the arm and column guideways inter-engaging. With the overarm in position on the column, the bracket 17ª with its mechanism is secured to the overarm and the screw 15 is threaded into the nut 16ª and then secured rigidly to the column by screws 15′. The overarm may thereafter be adjusted on the column and be secured in adjusted position in the same manner as has been described in reference to Figs. 1 to 4.

The term overarm herein is sometimes used to designate a structure consisting of one of the arms 7 or 30 together with the bars or arms 24, and sometimes to designate one of the individual members. It will be obvious that, in effect, any of the individual members 7 or 30 or 24 are overarms which may be used in any combination to suit the need or convenience of a particular machining operation, and for which any one may be considered as a bracing member or bar for either of the others with which it is used.

What I claim is:

1. In a milling machine, the combination of a column, a horizontal spindle therein, and a cutter supporting overarm construction comprising a main overarm mounted on the column and two bracing bars therefor, the bars being secured to the column adjacent opposite sides thereof, extending outwardly therefrom parallel to the spindle and beneath the overarm and secured to the outer end of the overarm.

2. In a milling machine, the combination of a column, a cutter spindle, an overarm mounted on the column and having guide portions engaging therewith for adjustment relative to said spindle and parallel with the axis thereof to extend over a work support, said guide portions restraining other movement of said overarm, means for positively adjusting the overarm, two bracing bars adjustable in said column respectively on opposite sides of the spindle beneath the overarm, and fixed with the overarm at the end thereof over said work support, and means for securing the overarm and each of said bars to the column in the different adjusted positions thereof.

3. In a milling machine, the combination of a column provided with spaced front and rear guideways, an overarm mounted on the column and adapted to extend over a work support, the overarm being provided with spaced guideways slidably engaging the column guideways, means cooperating with the guideways for securing the overarm to the column, the construction being such that the overarm can be removed from the column by a relatively short longitudinal adjustment of the overarm to disengage the guideways thereof from the column guideways.

4. In a milling machine, the combination of a column, an overarm mounted on the column for horizontal adjustment and to extend over a work support, said overarm having guide portions fitting said column in a manner to restrain other overarm movement during such adjustment a cutter spindle vertically mounted in the overarm over the work support, two bracing bars each slidably engaging said overarm and respectively located at opposite sides of said spindle and means for securing the opposite ends of each bar with the column and in the end of the overarm over the work support.

5. In a milling machine, the combination of a column, a horizontal cutter spindle therein, a gear on the spindle, a hollow overarm mounted on the column and adapted to extend over a work support, a cutter spindle vertically mounted in the overarm over the work support, mechanism in the arm comprising a gear adapted to be driven from the spindle gear for driving the vertical spindle, two bracing bars guided in said column for movement relative to said overarm and respectively at opposite sides of the vertical spindle beneath the overarm, means for securing the opposite ends of each bar in the column and in the outer end of the overarm, means for adjusting the overarm longitudinally thereof on the column and means for rigidly securing the arm to the column.

6. In a milling machine, the combination of a column provided with spaced front and rear guideways, a cutter spindle, an overarm mounted on the column and adapted to extend over a work support, the overarm being provided with spaced guideways slidably engaging the column guideways, two bracing bars respectively at opposite sides of the spindle beneath the overarm, means for securing the opposite ends of each bar in the column and in the outer end of the overarm, and means cooperating with the guideways for securing the overarm to the column, the construction being such that the overarm can be removed from the column by a relatively short longitudinal adjustment of the overarm to disengage the guideways thereof from the column guideways.

7. In a milling machine, the combination of a column provided with spaced front and rear guideways, a gear rotatably mounted in the column, a hollow overarm mounted on the column and adapted to extend over a work support, the overarm being provided with spaced guideways slidably engaging the column guideways, a cutter spindle vertically mounted in the overarm over the work support, mechanism in the overarm for driving the spindle and including gearing extending downwardly between the guideways and engaging the first mentioned gear, two bracing bars respectively at opposite sides of the spindle beneath the overarm, means for securing the opposite ends of each bar in the column and in the outer end of the overarm, and means cooperating with the guideways for securing the overarm to the column.

8. In a milling machine, the combination of a column, a horizontal cutter spindle therein, a hollow overarm mounted on the column in slideways providing for adjustment thereof, a cutter spindle mounted vertically and supported from said arm for unitary adjustment and removal therewith, and transmission means for rotating the vertical spindle from the horizontal spindle including a reverser unitarily adjustable with said arm.

9. In a milling machine having a column, a spindle and an arbor supporting structure movable relative to said column, the combination of a plurality of structure support members spaced apart in a horizontal plane above said spindle and each adjustable both in said column and structure, and clamping means movable to move each member substantially in said horizontal plane and transverse to the adjustment of the members.

10. In a milling machine having a column, a horizontal spindle and an arbor supporting structure movable relative to said column, the combination of a plurality of members for the support of said structure from said column, said members being spaced apart in a horizontal plane above said spindle and each adjustable both in said column and support, and clamp means for said members adapted to move each member substantially in the direction of the other member both in said column and in said structure.

11. In a milling machine having a column, a horizontal spindle and an arbor supporting structure movable relative to said column, the combination of a plurality of members for the support of said structure from said column, said members being spaced apart in a horizontal plane above said spindle and each adjustable both in said column and structure, said column and structure each providing rigid portions of metal between said members, and a plurality of clamps for each member respectively associated with said column and with said structure and each having an element movable to thrust the member with which it is associated against one of said portions and in the direction of the other member.

12. In a milling machine the combination of a column, a horizontal spindle journaled at an upper level thereof, an overarm adjustable parallel with and above said spindle to project over a work support, said overarm having slide portions fitted with said column and restraining said overarm during said movement against other movement relative to said columns, and bracing means for said overarm including a plurality of members underneath said overarm and above said spindle and each slidably guided in said column for movement in parallelism with the adjustment of said overarm and independently thereof to extend over said work support, said members being spaced apart and the end of said overarm over said work support being slidably fitted with each member; whereby said members together provide additional restraining means during movement of said overarm.

13. In a milling machine the combination of a column, a horizontal spindle journaled at an upper level thereof, a plurality of members in said column and spaced apart above said horizontal spindle, each member being guided by said column for independent movement parallel with the axis of said horizontal spindle to project over a work support, a housing movably guided on said members above said work support for movement along said members and parallel with said horizontal spindle, and a vertical spindle journaled in said housing for movement therewith between said member, said members and the said position of the vertical spindle relative thereto providing a resistance against other vertical spindle movement which is substantially equal for opposite forces at right angles to a plane parallel with both spindle axes.

14. In a milling machine the combination of a column, a horizontal spindle journaled at an upper level thereof, a plurality of members in said column and spaced apart in a horizontal plane above said horizontal spindle, each member being guided by said column and independently movable parallel with the axis of said horizontal spindle to project over a work support, a housing movably guided on said members for movement above said work support and parallel with said horizontal spindle, a carrier slidably guided for vertical movement on said housing, and a vertical spindle journaled in said carrier in a position for its path of movement therewith to lie between said members, said members and the position of the vertical spindle path relative thereto providing a resistance against undesired movements of said vertical spindle which is substantially equal for two opposite forces at right angles to a plane parallel with the axis of both spindles.

15. In a milling machine the combination of a column, a horizontal spindle journaled at an upper level thereof, a plurality of members spaced apart in a horizontal plane above said horizontal spindle and independently movably guided in said column and projecting therefrom, a housing guided on said members for movement relative thereto and relative to said column and parallel with said horizontal spindle, a vertical spindle journaled in said housing for movement therewith and positioned between said members whereby to provide a resistance against other movement thereof which is substantially equal for opposite forces at right angles to the plane parallel with both said spindles; and transmission mechanism for said spindles including a drive member within said column and common to both said spindles, and a train connecting said drive member with said vertical spindle and including in the order mentioned a plurality of elements connected to permit relative movement therebetween and parallel with said horizontal spindle, a reverser carried by said housing, and a member fixed on said vertical spindle.

In witness whereof I hereto affix my signature.

FREDERICK C. ALLEN.